United States Patent
Chang et al.

(10) Patent No.: US 12,104,906 B2
(45) Date of Patent: Oct. 1, 2024

(54) CHIP-LEVEL DISC-TYPE ACOUSTO-OPTIC STANDING WAVE GYROSCOPE

(71) Applicant: NORTHWESTERN POLYTECHNICAL UNIVERSITY, Xi'an (CN)

(72) Inventors: Honglong Chang, Xi'an (CN); Lu Tian, Xi'an (CN); Qiang Shen, Xi'an (CN); Ge Yang, Xi'an (CN)

(73) Assignee: NORTHWESTERN POLYTECHNICAL UNIVERSITY, Xi'an (CN)

( * ) Notice: Subject to any disclaimer, the term of this patent is extended or adjusted under 35 U.S.C. 154(b) by 0 days.

(21) Appl. No.: 17/641,481

(22) PCT Filed: Sep. 30, 2021

(86) PCT No.: PCT/CN2021/122064
§ 371 (c)(1),
(2) Date: Mar. 9, 2022

(87) PCT Pub. No.: WO2022/252459
PCT Pub. Date: Dec. 8, 2022

(65) Prior Publication Data
US 2024/0053148 A1    Feb. 15, 2024

(30) Foreign Application Priority Data
Jun. 4, 2021 (CN) .......................... 202110625024.6

(51) Int. Cl.
*G01C 19/72* (2006.01)
(52) U.S. Cl.
CPC .................................. *G01C 19/721* (2013.01)
(58) Field of Classification Search
CPC .............. G01C 19/721; G01C 19/5698; G01C 19/5656
See application file for complete search history.

(56) References Cited

U.S. PATENT DOCUMENTS

| | | | |
|---|---|---|---|
| 10,746,548 B2 * | 8/2020 | Gregory | G01C 19/5684 |
| 2012/0227487 A1 * | 9/2012 | Ayazi | G01C 19/56 |
| | | | 216/6 |

FOREIGN PATENT DOCUMENTS

| | | | | |
|---|---|---|---|---|
| CN | 115855011 A | * | 3/2023 | |
| WO | WO-2017151869 A1 | * | 9/2017 | G01C 19/5698 |

* cited by examiner

*Primary Examiner* — Hwa Andrew Lee
(74) *Attorney, Agent, or Firm* — IPro, PLLC

(57) ABSTRACT

Disclosed is a chip-level disc-type acousto-optic standing wave gyroscope including a substrate and a gyroscope structure placed on an upper surface of the substrate; the substrate is in a shape of a circular disc; the gyroscope structure includes an acoustic wave drive module and an optical detection module, the acoustic wave drive module is arranged in a circular shape taking the center of the circular disc as an origin and extending outward radially, and the optical detection module is arranged in the middle of the acoustic wave drive module and is annular; the acoustic wave drive module includes an annular interdigitated transducer, a metal electrode layer group uniformly sputtered on the annular interdigitated transducer, annularly arranged metallic pillars and an annular reflection grating, respectively placed in sequence from center of the disk radially to periphery of the disk; the optical detection module includes a first grating coupler, an optical waveguide at a light source input end, a first coupler, a second coupler, an optical waveguide at a signal output end and a second grating coupler, which are connected in sequence. According to the technical solution of the disclosure, the sensitivity of gyroscope detection can be improved.

9 Claims, 1 Drawing Sheet

CHIP-LEVEL DISC-TYPE ACOUSTO-OPTIC STANDING WAVE GYROSCOPE

TECHNICAL FIELD

The disclosure relates to micro-sensors, in particular to a chip-level disc-type acousto-optic standing wave gyroscope.

BACKGROUND

A gyroscope is a sensor for measuring the rotational motion of a carrier relative to the inertial space, and is a core component of applications such as guidance control, inertial navigation and motion measurement. It plays an important role in the national strategic research field. Accuracy is a core indicator for evaluating the influence of gyroscope on the performance of inertial guidance system, and it has become a research hotspot around the world.

At present, MEMS solid-state wave gyroscope has become an international research hotspot due to its advantages of small size, wide dynamic range, good impact resistance and stability resulting from its fully symmetrical topological feature structure. However, the accuracy of MEMS solid-state wave gyroscopes is significantly lower than that of fiber-optic gyroscopes due to the constraints of technical factors such as its existing geometric topology, precision machining and adjustment, and weak signal detection. And, its dynamic response capability is also restricted. Therefore, taking full advantage of the solid-state wave principle to improve the potential of accuracy of a gyroscope and breaking through the technical bottleneck of the existing method to improve the accuracy have become the key to current research.

The characteristics of complementary technical advantages between MEMS solid-state wave gyroscopes and optical gyroscopes have become an important means to develop a new generation of high-precision on-chip solid-state gyroscopes based on MEMS technology. However, research on the combination of MEMS solid-state wave structures driven by acoustic wave and optical detection structures has just begun. At present, only Carnegie Mellon University has simply integrated the above two structures in 2018, and has initially verified the gyroscopic effect. However, the distribution of its key components such as interdigitated transducers, reflection gratings and waveguides are relatively scattered, and the physical space of the gyroscope device layer is not fully utilized, resulting in a small area of the waveguide exposed to secondary surface acoustic waves (SAW), which greatly attenuates the signal sensitivity. These defects significantly restrict the accuracy of acousto-optic gyroscopes.

SUMMARY

An object of the present disclosure is to provide a chip-level disc-type acousto-optic standing wave gyroscope to improve the detection sensitivity of the gyroscope.

For achieving the above object, the present disclosure provides the following technical solutions.

A chip-level disc-type acousto-optic standing wave gyroscope including a substrate and a gyroscope structure placed on an upper surface of the substrate; the substrate is in a shape of a circular disc; the gyroscope structure includes an acoustic wave drive module and an optical detection module, the acoustic wave drive module is arranged in a circular shape taking the center of the circular disc as an origin and extending outward radially, and the optical detection module is arranged in the middle of the acoustic wave drive module and is annular (ring-shaped); the acoustic wave drive module includes an annular interdigitated transducer, a metal electrode layer group uniformly sputtered on the annular interdigitated transducer, annularly arranged metallic pillars and an annular reflection grating, respectively placed in sequence from center of the disk radially to periphery of the disk; the optical detection module includes a first grating coupler, an optical waveguide at a light source input end, a first coupler, a second coupler, an optical waveguide at a signal output end and a second grating coupler, which are connected in sequence.

Further, the substrate includes, from top to bottom: a lithium niobate crystal layer, a silicon dioxide crystal layer, a lithium niobate crystal layer; or a lithium niobate crystal layer, a silicon dioxide crystal layer, a quartz crystal layer; or a lithium niobate crystal layer, a silicon dioxide crystal layer, and a silicon crystal layer.

Further, the acoustic wave drive module is formed by sputtering metal on a surface of an uppermost thin film layer of the substrate.

Further, the optical detection module is formed by etching the uppermost thin film layer of the substrate.

Further, the annular interdigitated transducer includes first interdigital fingers, second interdigital fingers, third interdigital fingers and fourth interdigital fingers.

Further, the metal electrode layer group includes a first metal electrode layer, a second metal electrode layer, a third metal electrode layer and a fourth metal electrode layer.

Further, the respective metal electrode layers of the metal electrode layer group are arranged on the respective quarter-circle structures at the center of the circular disc corresponding to the respective interdigital fingers of the annular interdigitated transducer.

Further, the annularly arranged metallic pillars includes a plurality of metal columns evenly arranged.

Further, both the first coupler and the second coupler are of a Y-shaped branch structure or a multi-mode interference coupling structure; the first coupler is used for dividing the optical waveguide at the light source input end into two branches with the same structure; the second coupler is used for coupling the two optical waveguide branches together.

According to the specific embodiments provided by the present disclosure, the present disclosure can achieve the following technical effects.

The disclosure arranges a multi-ring nested surface acoustic standing wave driving structure (i.e. the acoustic wave driving module) and a Mach-Zehnder interference annular waveguide optical detection structure (i.e. the optical detection module) on a circular disk structure. The annular interdigitated transducer, annularly arranged metallic pillars, annular waveguide and annular reflection grating are placed radially from the center of the disk to the periphery. By using a circular disk structure, the area of the waveguide affected by the secondary surface acoustic wave (SAW) caused by the Coriolis force is increased, and thus, the sensitivity of gyroscope detection is improved. A non-linear annular interdigitated transducer and an annular reflection grating are used to form an excitation mode of the SAW-driven gyroscope. Relying on the geometric constraints of the structure, the primary and secondary surface acoustic waves are peeled off, and the mechanical strain of the device crystal caused by the secondary surface acoustic wave vibration is converted into a variation of the refractive index of the optical waveguide. Therefore, the optical signal is diffracted during the propagation process, forming phase modulation. At the same time, a Mach-Zehnder interference method is used to merge the phase modulated optical signals in the two waveguide arms at the signal output end, and phase modulation is converted into optical intensity modulation for subsequent signal pickup and analysis. At the same time, by using a non-parallel annular ring waveguide structure with a large radius, bending loss can be avoided and signal conversion rate can be improved, and thus, the accuracy of the disc-type acousto-optic standing wave gyroscope can be improved.

BRIEF DESCRIPTION OF FIGURES

In order to more clearly illustrate the technical solutions of the embodiments of the present disclosure or in the prior art, the accompanying drawings required in the embodiments will be briefly introduced below. Obviously, the drawings in the following description are only some embodiments of the present disclosure. For those of ordinary skill in the art, other drawings can also be obtained according to these drawings without creative labor.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

The object of the present disclosure is to provide a chip-level disc-type acousto-optic standing wave gyroscope to improve the detection sensitivity of the gyroscope.

In order to make the above objects, features and advantages of the present disclosure more clear and easier to be understood, the present disclosure will be described in further detail below with reference to the accompanying drawings and specific embodiments.

Figure 1:
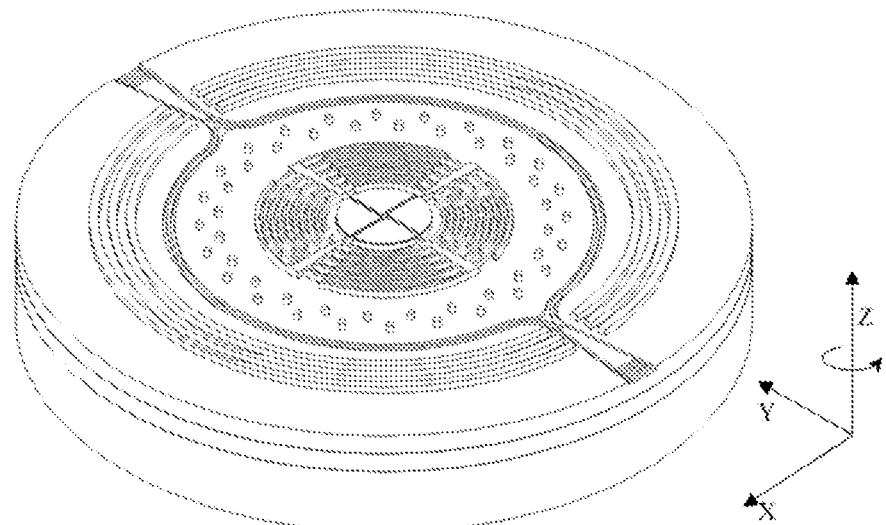
FIG. 1 is a three-dimensional schematic diagram of a chip-level disc-type acousto-optic standing wave gyroscope according to an embodiment of the present disclosure.
Figure 2:
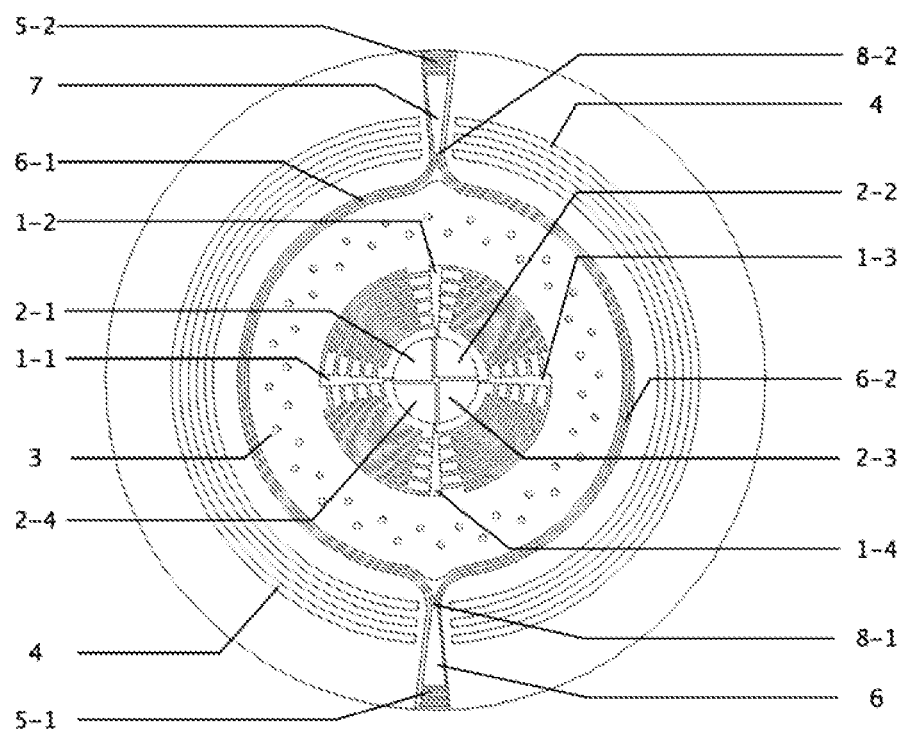
FIG. 2 is a top view of a chip-level disc-type acousto-optic standing wave gyroscope according to an embodiment of the present disclosure.
Figure 3:
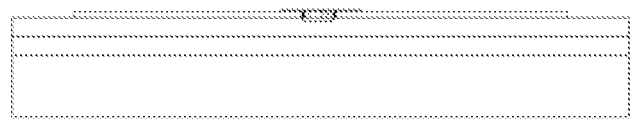
FIG. 3 is a front view of a chip-level disc-type acousto-optic standing wave gyroscope according to an embodiment of the present disclosure.

As shown in FIGS. 1-3, the chip-level disc-type acousto-optic standing wave gyroscope disclosed in the present disclosure includes a substrate and a gyroscope structure placed on the upper surface of the substrate; the substrate is in the shape of a circular disc; the gyroscope structure includes an acoustic wave drive a module and an optical detection module; the acoustic wave drive module is arranged in a circular shape taking the center of the disc as an origin and extending outward radially, and the optical detection module is arranged in the middle of the acoustic wave drive module and is annular.

The acoustic wave drive module includes an annular interdigitated transducer, a metal electrode layer group uniformly sputtered on the annular interdigitated transducer, annularly arranged metallic pillars 3 and an annular reflection grating 4, respectively placed in sequence from the center of the disk radially to the periphery of the disk.

The optical detection module includes a first grating coupler 5-1, an optical waveguide 6 at a light source input end, a first coupler 8-1, a second coupler 8-2, an optical waveguide 7 at a signal output end and a second grating coupler 5-2, which are connected in sequence.

The substrate is capable of realizing piezoelectric effect, photoelectric effect and acousto-optic effect. And in its common form, the substrate includes, from top to bottom: lithium niobate crystal layer-silicon dioxide crystal layer-lithium niobate crystal layer; or lithium niobate crystal layer-silicon dioxide crystal layer-quartz crystal layer; or lithium niobate crystal layer-silicon dioxide crystal layer-silicon crystal layer; etc. The uppermost thin film layer of the substrate needs to have acousto-optic effect converting the mechanical strain on the substrate material into a variation in the refractive index of the material.

The annular interdigitated transducer includes a circular interdigitated transducer composed of first interdigital fingers 1-1, second interdigital fingers 1-2, third interdigital fingers 1-3 and fourth interdigital fingers 1-4 formed by sputtering metal on the surface of the uppermost thin film layer of the substrate.

The metal electrode layer group includes a first metal electrode layer 2-1, a second metal electrode layer 2-2, a third metal electrode layer 2-3 and a fourth metal electrode layer 2-4.

Metal electrode layers are uniformly sputtered on the quarter circle structure of the first interdigital fingers 1-1 at the center of the circular disc, the quarter circle structure of the second interdigital fingers 1-2 at the center of the circular disc, the quarter circle structure of the third interdigital fingers 1-3 at the center of the circular disc, and the quarter-circle structure of the fourth interdigital fingers 1-4 at the center of the circular disc, forming a first metal electrode layer 2-1, a second metal electrode layer 2-2, and a third metal electrode layer 2-3 and the fourth metal electrode layer 2-4.

By secondary sputtering of metal on the surface of the uppermost thin film layer of the substrate, annularly arranged metallic pillars 3 for sensitive angular velocity is formed. The annularly arranged metallic pillars 3 includes a plurality of metal columns 3-0*n*~3-*nn* (n=1, 2, 3, . . . ) evenly arranged. An annular reflection grating 4 for reflecting surface acoustic waves is formed by sputtering metal on the surface of the uppermost thin film layer of the substrate.

An optical waveguide 6 at a light source input end adopts a first coupler 8-1 to divide the waveguide into two branches with the same structure, namely 6-1 and 6-2. And the output optical waveguide 7 at the signal output end adopts a second coupler 8-2 to connect the optical waveguide branches 6-1 and 6-2 together. The couplers 8-1 and 8-2 can adopt a Y-shaped branch structure or a multi-mode interference coupling structure. The function of the first coupler 8-1 is to divide the waveguide into two branches with the same structure, so that the intensity of the optical signal transmitted in the two optical waveguide branches is equal. The function of the second coupler 8-2 is to merge the two optical waveguides together. The optical signals in the two optical waveguide branches are converged and coupled to the signal output for subsequent signal pickup and analysis.

The detailed working process of the overall structure designed by the present disclosure is as follows.

By applying an external excitation signal on the metal electrode layer 2-1, 2-2, 2-3 and 2-4 on the annular interdigitated transducer composed of the first interdigital fingers 1-1, the second interdigital fingers 1-2, the third interdigital fingers 1-3 and the fourth interdigital fingers 1-4 to generate an alternating electric field, the surface of the uppermost thin film layer of the substrate is excited due to the inverse piezoelectric effect, and thus generating a surface acoustic wave (SAW) for the driving mode of the gyroscope. In the process of propagating to the outside in the radial direction, the surface acoustic wave acts on the annularly arranged metallic pillars 3, the annular reflection grating 4, the optical waveguide branch 6-1 and the optical waveguide branch 6-2. Since the surface acoustic wave will transmit in the direction opposite to the propagating direction under the action of the reflection grating, a standing wave will be formed between the annular interdigitated transducer and the annular reflection grating. Therefore, the annularly arranged metallic pillars and the two optical waveguide branches will be affected by the standing wave of the surface acoustic wave (SAW), wherein the annularly arranged metallic pillars are located in the wave peak position of the SAW standing wave, and the two optical waveguide branches are located at the wave node position of the SAW standing wave. When the gyroscope has an external angular velocity along the Z axis, the annularly arranged metallic pillars 3 will be affected by the Coriolis force, producing a secondary surface acoustic wave fluctuating in the direction perpendicular to the surface acoustic wave propagating radially. This wave acts on the optical waveguide branches 6-1 and 6-2, generating stress and thus causing periodic strain inside the crystal of the substrate. The mechanical strain is continuously transmitted, resulting in the occurrence of deformation in the optical waveguide branches 6-1 and 6-2, and thus causing variation of the refractive index of the optical waveguide branches 6-1 and 6-2. The laser light emitted from the laser light source enters the input optical waveguide 6 at a light source input end through the first grating coupler 5-1 at the light source input end, and is divided into two beams with equal light intensity through the Y-shaped connection structure 8-1. The two beams of light signals in the optical waveguide branches 6-1 and 6-2 are both modulated by the refractive index variation of the waveguide containing the above-mentioned driving mode angular velocity signal. The two modulated beams of light interfere through the second Y-shaped branch structure 8-2, and enter the second grating coupler 5-2 at the signal output end through the output optical waveguide 7. And then, the optical signal in the second grating coupler 5-2 is input into the photodetector for signal conversion, and the output signal is the gyroscope angular velocity signal, thus realizing the pick-up and detection of the angular velocity signal.

Compared with the prior art, the present disclosure has at least the following beneficial effects:

The chip-level disc-type acousto-optic standing wave gyroscope proposed by the disclosure adopts a working principle of the standing wave mode, and strips the primary surface acoustic wave and the secondary surface acoustic wave by using the geometric constraint relationship on the structure, so as to avoid signal mixing and help enhancing the signal-to-noise ratio of signal detection. A ring waveguide structure based on Mach-Zehnder interference is designed, which uses a non-linear annular waveguide with a large radius of curvature to reduce right-angle loss, reduce the insertion loss of optical signals during transmission, and improve the signal conversion rate. The acoustic wave drive module and the optical detection module as designed do not have any suspension structure, and have the characteristics of strong impact resistance and robustness. The acousto-optic standing wave gyroscope as designed is based on a circular disc structure, making full use of the physical space to increase the area of the waveguide influenced by the secondary surface acoustic wave, and thus, the sensitivity of the sensor is further improved on the basis of the compact structure.

Specific Embodiment

The substrate material used in the chip-level disc-type acousto-optic standing wave gyroscope in an embodiment is lithium niobate crystal-insulator (LNOI), that is, including, from top to bottom, lithium niobate thin film layer-silicon dioxide crystal layer-lithium niobate crystal layer. The gyroscope structure placed on the upper surface of the substrate includes an acoustic wave drive module and an optical detection module. The acoustic wave drive module is formed by sputtering metal on the surface of the uppermost thin film layer of the LNOI substrate. And the optical detection module is formed by etching the uppermost thin film layer on the LNOI substrate.

The thickness of the uppermost thin film layer of the LNOI substrate is 500 nm. In the acoustic wave drive module, the inner radius, outer radius and thickness of the annular interdigitated transducer composed of the first interdigital fingers 1-1, the second interdigital fingers 1-2, the third interdigital fingers 1-3 and the fourth interdigital fingers 1-4 are 160 μm, 350 μm, and 500 nm, respectively. At the inner ring of the annular interdigitated transducer, each interdigital fingers extends a structure for sputtering a metal electrode layer, where the first metal electrode layer 2-1, the second metal electrode layer 2-2, the third metal electrode layer 2-3 and the fourth metal electrode layer 2-4 are formed by sputtering, and together they form a circle with a radius of 130 μm and a thickness of 300 nm. The annularly arranged metallic pillars 3 is a ring composed of a total of 40 metal columns 3-01 to 3-40 evenly arranged in two circles, and its inner radius and outer radius are 450 μm and 500 μm respectively. The radius and thickness of the respective metal column are 1 μm and 800 nm respectively. The inner radius, outer radius and thickness of the annular reflector 4 are 680 μm, 800 μm and 500 nm respectively. In the optical detection module, the grating coupler and the optical waveguide are formed by etching the uppermost thin film layer on the LNOI substrate with an etching depth of 300 nm. The radius of the annular optical waveguide is 580 μm. The input optical waveguide 6 is divided into two branches 6-1 and 6-2 with the same structure by using the first Y-shaped branch structure 8-1. The second Y-shaped branch structure 8-2 is used to merge the two branches 6-1 and 6-2 of the input optical waveguide 6 together and thus be coupled to the output optical waveguide 7.

In this disclosure, specific examples are used to illustrate the principles and implementations of the present disclosure. The descriptions of the above embodiments are only used to help understand the methods and core ideas of the present disclosure. Meanwhile, for those skilled in the art, according to the ideas of the present disclosure, there will be various variations in the specific implementation mode and application scope. In conclusion, the contents of this specification should not be construed as limitation to the present disclosure.

What is claimed is:

1. A chip-level disc-type acousto-optic standing wave gyroscope comprising a substrate and a gyroscope structure placed on an upper surface of the substrate;
   the substrate is in a shape of a circular disc;
   the gyroscope structure includes an acoustic wave drive module and an optical detection module, the acoustic wave drive module is arranged in a circular shape taking the center of the circular disc as an origin and extending outward radially, and the optical detection module is arranged in the middle of the acoustic wave drive module and is annular;

the acoustic wave drive module includes an annular interdigitated transducer, a metal electrode layer group uniformly sputtered on the annular interdigitated transducer, annularly arranged metallic pillars and an annular reflection grating, respectively placed in sequence from center of the disk radially to periphery of the disk;

the optical detection module includes a first grating coupler, an optical waveguide at a light source input end, a first coupler, a second coupler, an optical waveguide at a signal output end and a second grating coupler, which are connected in sequence.

2. The chip-level disc-type acousto-optic standing wave gyroscope according to claim 1, wherein the substrate includes, from top to bottom:
  a lithium niobate crystal layer, a silicon dioxide crystal layer, a lithium niobate crystal layer; or
  a lithium niobate crystal layer, a silicon dioxide crystal layer, a quartz crystal layer; or
  a lithium niobate crystal layer, a silicon dioxide crystal layer, and a silicon crystal layer.

3. The chip-scale disc-type acousto-optic standing wave gyroscope according to claim 1, wherein the acoustic wave drive module is formed by sputtering metal on a surface of an uppermost thin film layer of the substrate.

4. The chip-scale disc-type acousto-optic standing wave gyroscope according to claim 1, wherein the optical detection module is formed by etching the uppermost thin film layer of the substrate.

5. The chip-scale disc-type acousto-optic standing wave gyroscope according to claim 1, wherein the annular interdigitatd transducer includes first interdigital fingers, second interdigital fingers, third interdigital fingers and fourth interdigital fingers.

6. The chip-scale disc-type acousto-optic standing wave gyroscope according to claim 5, wherein the metal electrode layer group includes a first metal electrode layer, a second metal electrode layer, a third metal electrode layer and a fourth metal electrode layer.

7. The chip-level disc-type acousto-optic standing wave gyroscope according to claim 1, wherein the respective metal electrode layers of the metal electrode layer group are arranged on the respective quarter-circle structures at the center of the circular disc corresponding to the respective interdigital fingers of the annular interdigitated transducer.

8. The chip-level disc-type acousto-optic standing wave gyroscope according to claim 1, wherein the annularly arranged metallic pillars includes a plurality of metal columns evenly arranged.

9. The chip-level disc-type acousto-optic standing wave gyroscope according to claim 1, wherein
  both the first coupler and the second coupler are of a Y-shaped branch structure or a multi-mode interference coupling structure;
  the first coupler is used for dividing the optical waveguide at the light source input end into two branches with the same structure;
  the second coupler is used for coupling the two optical waveguide branches together.

* * * * *